United States Patent
Li et al.

(10) Patent No.: US 11,753,786 B2
(45) Date of Patent: Sep. 12, 2023

(54) FIXED PERMEABLE BREAKWATER DOUBLING AS WAVE ENERGY GENERATING DEVICE

(71) Applicant: LUDONG UNIVERSITY, Yantai (CN)

(72) Inventors: Xueyan Li, Yantai (CN); Chunyi Xiu, Yantai (CN); Zhenhua Zhang, Yantai (CN); Zhi Cheng, Weifang (CN); Yujie Meng, Zhangqiu (CN); Jinke Li, Liuzhou (CN)

(73) Assignee: Ludong University, Yantai (CN)

( * ) Notice: Subject to any disclaimer, the term of this patent is extended or adjusted under 35 U.S.C. 154(b) by 0 days.

(21) Appl. No.: 17/582,022

(22) Filed: Jan. 24, 2022

(65) Prior Publication Data
US 2023/0060923 A1 Mar. 2, 2023

(30) Foreign Application Priority Data
Sep. 2, 2021 (CN) .......................... 202111024473.1

(51) Int. Cl.
*E02B 3/06* (2006.01)
*E02B 9/08* (2006.01)

(52) U.S. Cl.
CPC . *E02B 3/06* (2013.01); *E02B 9/08* (2013.01)

(58) Field of Classification Search
CPC ..................................... E02B 3/06; E02B 9/08
See application file for complete search history.

(56) References Cited

U.S. PATENT DOCUMENTS

| | | | | |
|---|---|---|---|---|
| 3,538,710 A | * | 11/1970 | Tourmen | E02B 3/06 405/31 |
| 6,967,413 B2 | * | 11/2005 | Atiya | F03B 13/26 290/43 |
| 2001/0000197 A1 | * | 4/2001 | Gorlov | F03D 13/20 114/274 |
| 2013/0333370 A1 | * | 12/2013 | Hopper | F03B 7/003 60/495 |

FOREIGN PATENT DOCUMENTS

ES    2066730    * 3/1995

* cited by examiner

*Primary Examiner* — Sean D Andrish

(57) ABSTRACT

A fixed permeable breakwater which also serves as a wave power generating device is provided and includes a structure, a structure fixing device and a wave-activated generator set, the structure is connected with a seabed through the structure fixing device, holes are arranged on an outer side of upper arc vertical walls of the structure, and spiral vane sets are placed in the holes; a spiral-gear generator is installed on the horizontal bearing plate, and waves push the spiral vane sets to rotate, and then push the spiral-gear generator to generate electricity.

12 Claims, 1 Drawing Sheet

FIXED PERMEABLE BREAKWATER DOUBLING AS WAVE ENERGY GENERATING DEVICE

TECHNICAL FIELD

The invention relates to the technical field of dynamic experimental devices for hydraulic structures, and particularly to a fixed permeable breakwater which can also be used as a wave power generating device.

BACKGROUND

Conventional gravity breakwater has some negative effects, such as being not permeable to water flow, unfavourable to shipping, causing sediment deposition, water pollution and so on, which is contrary to the construction of modern green port engineering. The permeable breakwater has the ability of water exchange, and is convenient to construct, and the new breakwater with reasonable cost can better meet the development requirements of deep-water port and green port construction currently.

The permeable structure will increase the wave permeability, which will make partial waves continue to propagate through the dike, negatively affecting the mooring stability conditions in the sheltered waters. Moreover, the same structure has different transmission and reflection characteristics for waves with different wave heights and periods, which adversely affects the mooring conditions of ships in the port area. In addition, the seawater is in direct contact with the seawater power generating device, which easily causes seawater erosion or plankton to attach to the power generating device, resulting in low power generation efficiency or damage to the power generating device.

SUMMARY

An objective of the invention is to overcome the shortcomings of the prior art and provide a fixed permeable breakwater which can also be used as a wave power generating device.

The technical schemes provided by the invention is that the fixed permeable breakwater doubling as the wave power generating device including: a structure, a structure fixing device, and a wave-activated generator set (also referred to as wave-activated electric generator set).

The structure includes a horizontal bearing plate, a first upper arc vertical wall, a second upper arc vertical wall, a first lower wave baffle, a second lower wave baffle, vertical short pipes as an enclosure and transversal long pipes as another enclosure.

The first upper arc vertical wall and the second upper arc vertical wall are respectively arranged on two opposite sides of the horizontal bearing plate.

The lower part of the first upper arc vertical wall is connected with the upper end of the first lower wave baffle, and the first lower wave baffle is vertical to the horizontal bearing plate; the lower part of the second upper arc vertical wall is connected with the upper end of the second lower wave baffle, and the second lower wave baffle is vertical to the horizontal bearing plate.

The two opening sides of the horizontal bearing plate are respectively provided with the transversal long pipes, and two opposite ends of each of the transversal long pipes are respectively connected with the first upper arc vertical wall and the second upper arc vertical wall; the vertical short pipes are fixed on the transversal long pipes.

The structure fixing device includes four pile foundation pillars which are respectively fixedly connected with four corners under the horizontal bearing plate of the fixed permeable breakwater.

The wave-activated generator set includes spiral vane sets installed in the first upper arc vertical wall and the second upper arc vertical wall, and is configured to drive electric generators through flexible shaft transmission device to generate electricity for utilization or storage.

Furthermore, upper support pillars are arranged between the two ends of each of the first upper arc vertical wall and the second upper arc vertical wall and the horizontal bearing plate, thereby forming inclined triangular supports.

Furthermore, lower support pillars are arranged between the two ends of each of the first lower wave baffle and the second lower wave baffle and the horizontal bearing plate, thereby forming inclined triangular supports.

The effects of the invention are as follows: 1. in consideration of the port environment, the fixed permeable breakwater is fixed by pile foundation to ensure that the structure is stable; 2. the fixed permeable breakwater has characteristics of good structural integrity, low costs, high utilization rate and easy use; 3. the mechanical properties of all parts of the structure are good and the structure is stable; 5. compared with the conventional permeable breakwater, the hydrodynamic tests of structures with different scales may be carried out according to various test environments, and partial incident wave can be effectively reduced by setting baffles on the back-facing and wave-facing surfaces; 6. the fixed permeable breakwater is good in wave dissipation effects, bears small structural stress, is good in water exchange ability and shielding effect, is simple in structural form, and applicable in practical engineering; 7. through comprehensive consideration of the composition and layout of the fixed permeable breakwater, it has the characteristics of stable structure, good energy dissipation effects, high power generation conversion efficiency, easy installation, easy maintenance and a short construction period.

Figure 1:
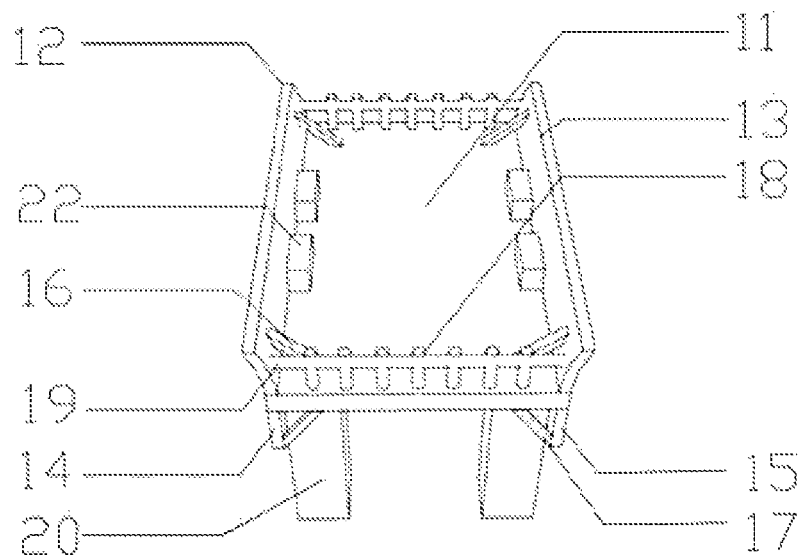
FIG. 1 is a schematic structural diagram of the fixed permeable breakwater of the invention.

In the drawing: 11: horizontal bearing plate, 12: first upper arc vertical wall, 13: second upper arc vertical wall, 14: first lower wave baffle, 15: second lower wave baffle, 16: upper support pillar, 17: lower support pillar, 18: vertical short pipe, 19: transversal long pipe, 20: pile foundation pillar, 21: spiral vane set and 22: generator.

DETAILED DESCRIPTION OF THE EMBODIMENTS

In order to facilitate further understanding of the content, characteristics and functions of the invention, the detailed description is as follows with the accompanying drawings.

Figure 2:
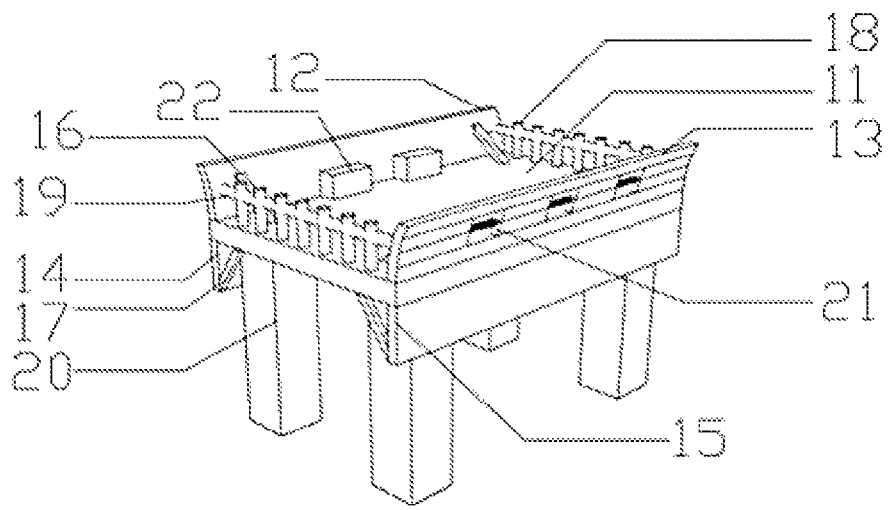
FIG. 2 is a schematic view of the inclined side structure of the fixed permeable breakwater of the invention.
Figure 3:
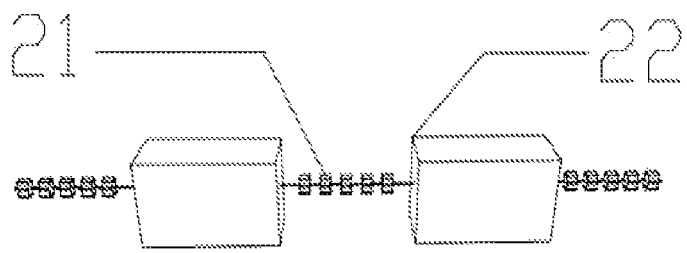
FIG. 3 is a schematic diagram of the wave-activated generator set of the invention.

As shown in FIG. 1, FIG. 2 and FIG. 3, a fixed permeable breakwater doubling as a wave power generating device includes three parts: a structure, a structure fixing device and a wave-activated generator set; the three parts are rust-free and light-weighted.

The structure includes the horizontal bearing plate 11, the first upper arc vertical wall 12, the second upper arc vertical wall 13, the first lower wave baffle 14, the second lower wave baffle 15, the vertical short pipes 18 as an enclosure and transversal long pipes 19 as another enclosure.

The first upper arc vertical wall 12 and the second upper arc vertical wall 13 are correspondingly arranged on two opposite sides of the horizontal bearing plate 11, that is, the first upper arc vertical wall 12 is arranged on one side of the horizontal bearing plate 11, the second upper arc vertical wall 13 is arranged on another side of the horizontal bearing plate 11; and the first upper arc vertical wall 12 corresponds to the second upper arc vertical wall 13.

The upper end of the first lower wave baffle 14 is connected with the lower part of the first upper arc vertical wall 12 and is vertical to the horizontal bearing plate 11; the upper end of the second lower wave baffle 15 is connected with the lower part of the second upper arc vertical wall 13 and is vertical to the horizontal bearing plate 11; the first lower wave baffle 14, the first upper arc vertical wall 12 and the horizontal bearing plate 11 constitute a whole, and the second lower wave baffle 15, the second upper arc vertical wall 13 and the horizontal bearing plate 11 constitute a whole.

Upper support pillars 16 are arranged between the two ends of the first upper arc vertical wall 12 and connected with the horizontal bearing plate, thereby forming inclined triangular supports; meanwhile, there are also upper support pillars 16 between the opposite second upper arc vertical wall 13 and the horizontal bearing plate 11, which are symmetrically arranged to keep the first upper arc vertical wall 12 and the second upper arc vertical wall 13 stable.

Lower support pillars 17 are arranged inside the first lower wave baffle 14 and connected with the horizontal bearing plate 11, thereby forming inclined triangular supports; meanwhile, lower support pillars 17 are also symmetrically arranged between the opposite second lower wave baffle 15 and the horizontal bearing plate 11, so as to keep the second lower wave baffle 15 and the horizontal bearing plate 11 stable.

The vertical short pipes 18 are vertically placed on the two unclosed opening sides of the horizontal bearing plate 11, and the two opposite sides are integrally connected with the first upper arc vertical wall 12 and the second upper arc vertical wall 13 by transversal long pipes 19; seven vertical short pipes 18 are uniformly arranged on both two sides of the horizontal bearing plate 11, and the long through-pipes 19 are arranged in the middle of the vertical short pipes 18 in the vertical direction.

The structure fixing device includes four pile foundation pillars 20 which are respectively fixedly connected with four corners under the horizontal bearing plate 11.

The wave-activated generator set includes three spiral vane sets installed in the first upper arc vertical wall 12 and the second upper arc vertical wall 13, and is configured to drive the generators 22 through the flexible shaft transmission device to generate electricity for utilization or storage.

The invention relates to the fixed permeable breakwater doubling as the wave power generating device. When in use, the permeable breakwater is assembled according to the design and adjusted according to different working conditions to ensure the test accuracy.

Although the embodiments of the invention have been described with reference to the accompanying drawings, the invention is not limited to the above-mentioned specific embodiments, which are only illustrative and not restrictive, and ordinary technicians in the field may make more forms under the inspiration of the invention without departing from the purpose of the invention and the scope defined by the claims, all of which are within the scope of protection of the invention.

What is claimed is:

1. A fixed permeable breakwater doubling as a wave power generating device, comprising: a structure, a structure fixing device and a wave-activated generator set;
    wherein the structure comprises: a horizontal bearing plate, a first upper wall, a second upper wall, a first lower wave baffle, a second lower wave baffle, vertical pipes, and transversal pipes;
    wherein the first upper wall and the second upper wall are respectively arranged on two opposite sides of the horizontal bearing plate;
    wherein a lower part of the first upper wall is connected with an upper end of the first lower wave baffle, and the first lower wave baffle is vertical to the horizontal bearing plate; a lower part of the second upper wall is connected with an upper end of the second lower wave baffle, and the second lower wave baffle is vertical to the horizontal bearing plate;
    wherein two opening sides of the horizontal bearing plate are respectively provided with the transversal pipes, and two opposite ends of each of the transversal pipes are respectively connected with the first upper wall and the second upper wall; the vertical pipes are fixed on the transversal pipes;
    wherein the structure fixing device comprises four pile foundation pillars which are respectively fixedly connected with four corners of a bottom surface of the horizontal bearing plate of the fixed permeable breakwater;
    wherein the wave-activated generator set comprises spiral vane sets installed in the first upper wall and the second upper wall, and is configured to drive electric generators through flexible shaft transmission to generate electricity for utilization or storage; and
    wherein the first upper wall has a first arc shape structure, and the second upper wall has a second arc shape structure; and the first arc shape structure and the second arc shape structure are respectively bent outwards, thereby an upper part of the first upper wall extends more outwards than the lower part of the first upper wall, and an upper part of the second upper wall extends more outwards than the lower part of the second upper wall.

2. The fixed permeable breakwater doubling as a wave power generating device according to claim 1, wherein upper support pillars are arranged between two ends of each of the first upper wall and the second upper wall and the horizontal bearing plate, thereby forming inclined triangular supports.

3. The fixed permeable breakwater doubling as a wave power generating device according to claim 1, wherein lower support pillars are arranged between two ends of each of the first lower wave baffle and the second lower wave baffle and the horizontal bearing plate, thereby forming inclined triangular supports.

4. The fixed permeable breakwater doubling as a wave power generating device according to claim 1, wherein two ends of each of the vertical pipes extend outwards relative to a corresponding one of the transversal pipes on which the vertical pipes are fixed.

5. The fixed permeable breakwater doubling as a wave power generating device according to claim 4, wherein each of the vertical pipes is divided into an upper part and a lower part by a corresponding one of the transversal pipes, and a length of the upper part is less than a length of the lower part.

6. The fixed permeable breakwater doubling as a wave power generating device according to claim 5, wherein there is a first gap between the upper parts of adjacent two vertical pipes fixed on a same one of the transversal pipes, there is a second gap between the lower parts of adjacent two vertical pipes fixed on the same one of the transversal pipes, and the first gap and the second gap are separated by the same one of the transversal pipes.

7. The fixed permeable breakwater doubling as a wave power generating device according to claim 1, wherein the electric generators are disposed on the horizontal bearing plate and located at inner sides of the first upper wall and the second upper wall, and each of the electric generators is disposed between adjacent two of the spiral vane sets, and connected to the adjacent two of the spiral vane sets.

8. A fixed permeable breakwater doubling as a wave power generating device, comprising: a structure, a structure fixing device and a wave-activated generator set;
    wherein the structure comprises: a horizontal bearing plate, a first upper wall, a second upper wall, a first lower wave baffle, a second lower wave baffle, vertical pipes, and transversal pipes;
    wherein the first upper wall and the second upper wall are respectively arranged on two opposite sides of the horizontal bearing plate;
    wherein a lower part of the first upper wall is connected with an upper end of the first lower wave baffle, and the first lower wave baffle is vertical to the horizontal bearing plate; a lower part of the second upper wall is connected with an upper end of the second lower wave baffle, and the second lower wave baffle is vertical to the horizontal bearing plate;
    wherein two opening sides of the horizontal bearing plate are respectively provided with the transversal pipes, and two opposite ends of each of the transversal pipes are respectively connected with the first upper wall and the second upper wall; the vertical pipes are fixed on the transversal pipes;
    wherein the structure fixing device comprises four pile foundation pillars which are respectively fixedly connected with four corners of a bottom surface of the horizontal bearing plate of the fixed permeable breakwater;
    wherein the wave-activated generator set comprises spiral vane sets installed in the first upper wall and the second upper wall, and is configured to drive electric generators through flexible shaft transmission to generate electricity for utilization or storage; and
    wherein the first upper wall has a first arc shape structure, and the second upper wall has a second arc shape structure; and the first arc shape structure and the second arc shape structure are respectively bent outwards, thereby a distance between the lower part of first upper wall and the lower part of the second upper wall in a direction of a width of the horizontal bearing plate is less than a distance between an upper part of the first upper wall and an upper part of the second upper wall in the direction of the width of the horizontal bearing plate.

9. The fixed permeable breakwater doubling as a wave power generating device according to claim 8, wherein two ends of each of the vertical pipes extend outwards relative to a corresponding one of the transversal pipes on which it is the vertical pipes are fixed.

10. The fixed permeable breakwater doubling as a wave power generating device according to claim 9, wherein each of the vertical pipes is divided into an upper part and a lower part by a corresponding one of the transversal pipes, and a length of the upper part is less than a length of the lower part.

11. The fixed permeable breakwater doubling as a wave power generating device according to claim 10, wherein there is a first gap between the upper parts of adjacent two vertical pipes fixed on a same one of the transversal pipes, there is a second gap between the lower parts of adjacent two vertical pipes fixed on the same one of the transversal pipes, and the first gap and the second gap are separated by the same one of the transversal pipes.

12. The fixed permeable breakwater doubling as a wave power generating device according to claim 8, wherein the electric generators are disposed on the horizontal bearing plate and located at inner sides of the first upper wall and the second upper wall, and each of the electric generators is disposed between adjacent two of the spiral vane sets, and connected to the adjacent two of the spiral vane sets.

\* \* \* \* \*